Jan. 15, 1929.
C. O. J. MONTELIUS
1,698,802
DEVICE FOR TRANSFERRING ENERGY TO OR FROM A FLUID
Filed March 20, 1925  2 Sheets-Sheet 1
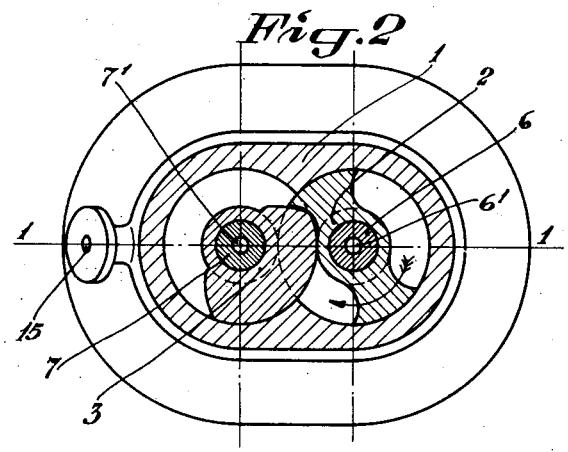
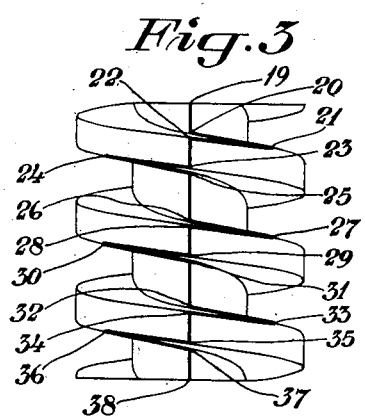
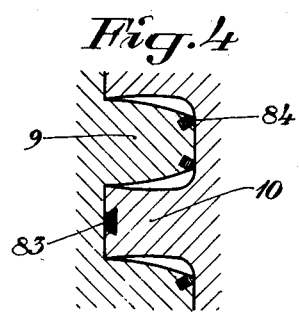
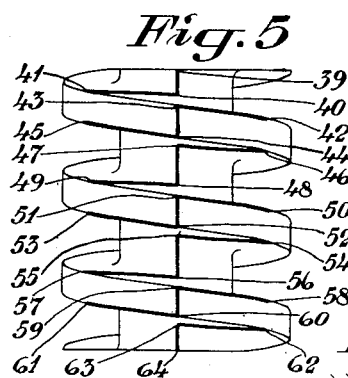
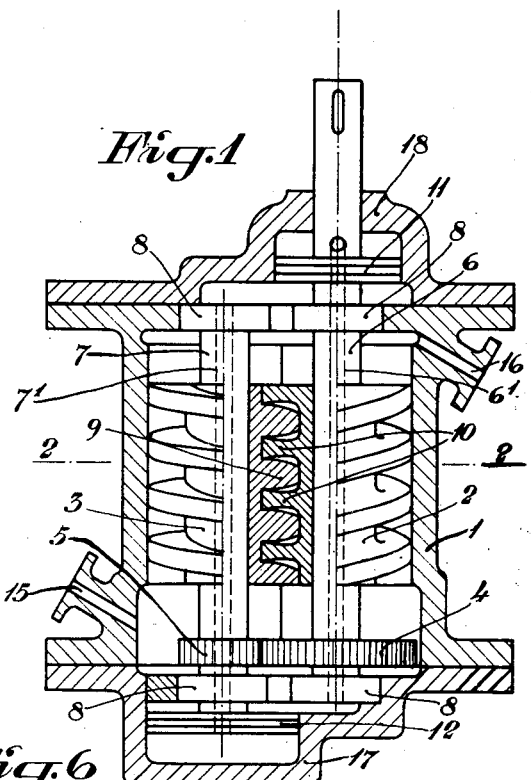
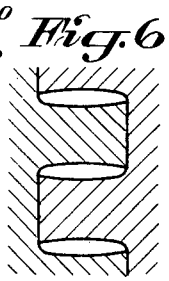
Inventor
C. O. J. Montelius Jan. 15, 1929.   1,698,802
C. O. J. MONTELIUS
DEVICE FOR TRANSFERRING ENERGY TO OR FROM A FLUID
Filed March 20, 1925   2 Sheets-Sheet 2

Inventor
C. O. J. Montelius

Patented Jan. 15, 1929.

1,698,802

UNITED STATES PATENT OFFICE.

CARL OSCAR JOSEF MONTELIUS, OF STOCKHOLM, SWEDEN.

DEVICE FOR TRANSFERRING ENERGY TO OR FROM A FLUID.

Application filed March 20, 1925. Serial No. 17,108, and in Sweden April 7, 1924.

My invention relates to devices for transferring energy to or from a fluid consisting of two screws mounted on parallel shafts, having opposite pitch and being rotated in opposite directions, said screws being enveloped by a casing fitting to the periphery of the screws, but allowing free admission of the fluid to the end surfaces of the screws. Such arrangements are known, but failing to achieve the necessary fluid-tight construction, their efficiency is insufficient.

I avoid the said drawback through a special form of the screws ensuring a fluid-tight arrangement and by fixing the number of screw threads in a certain way.

For the complete understanding of the invention, reference is to be had to the following description and accompanying drawings where Fig. 1 is a partial longitudinal section of a pump or motor embodying this invention.

Fig. 2 is a cross-section on the line 2—2 of Fig. 1.

Fig. 3 is a view of one of the screws in Fig. 1 on an enlarged scale.

Fig. 4 is a fractional longitudinal section of the screws shown in Figs. 1 and 2.

Fig. 5 is a view similar to that of Fig. 3, but showing a screw adapted to work against a single-thread screw according to known devices of the kind in question.

Fig. 6 is a view similar to that of Fig. 4, but referring to the screw according to Fig. 5.

Figure 9:
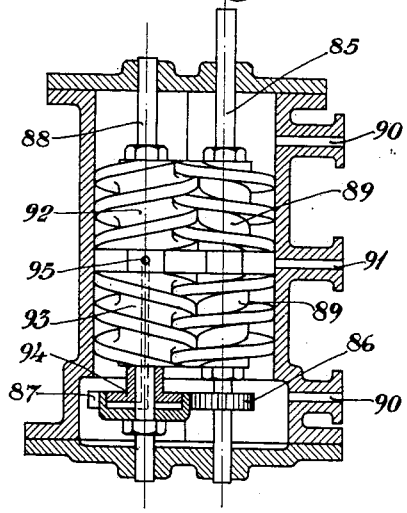
Fig. 9 is a longitudinal section of a double-pair screw pump or motor according to the invention.

Referring first to the embodiment of the invention shown in Figs. 1 and 2, 1 designates the housing, forming an interior chamber having the shape of two intersecting cylinders, fitting the outside of screws 2 and 3 rotatable in said housing. At both ends said inner chamber is closed by two end plates 17 and 18 fixed to the housing 1. The housing 1 is provided with an inlet 15 and a discharge opening 16, placed at opposite ends of same.

The screws 2 and 3 are fixed on two shafts 6 and 7, each of said shafts being supported by two ball bearings 8.

The shafts 6 and 7 are connected with each other by gear wheels 4 and 5 having a gear ratio of 1:2. The screws 2 and 3 have different pitch, the first one 2 having two threads and the second one 3 one thread only. In order to avoid axial thrust on the bearings, compensating pistons 11 and 12 fitting into recesses in the end walls are fixed on the shafts, said recesses being in communication with the fluid on the opposite ends of the screws through longitudinal bores 6' and 7', respectively, in the shafts. The shaft 7 projects through the end plate 18 and is adapted to be connected to driving means, or, if the device is used as motor, to transfer the power of the shaft to driven apparatuses.

In operation as a pump it be assumed that the shaft 6 is rotated in the direction of the arrow in Fig. 2. The fluid, which is conducted through a pipe, not shown in the drawing, to the inlet 15 is then captured by the threads 9 of the screw 3 and the threads 10 of the screw 2 and forced to the other end of the screws and escapes through the outlet 16, to which a second pipe may be attached.

The helical surfaces of the screws are given a special form. Said helical surfaces are limited between preferably cylindrical or conical surfaces. The forms of the helical surfaces are defined thereby that the edge of one screw, preferably a spiral line, constantly touches the helical surface of the other screw and the outside edge of said latter helical surface touches the surface of the former screw.

Fig. 3 illustrates the single-thread screw 3 in Fig. 1, turned 90 degrees, having the lines of contact against the double-thread screw 2, Fig. 1, marked with a heavy line.

The sum of the radius R of the outside perimeter of one screw and of the radius r of the bottom surface of the groove in the other screw must be equal to the axle distance (with a small clearance). The parts 19—20, 22—23, 25—26, 28—29, 31—32, 34—35 and 37—38 of the heavy line in Fig. 3 indicate the contact between the outside perimeter of one screw against the bottom surface in the grooves of the other screw. The curved parts 20—21, 21—22, 23—24, 24—25, 26—27, 27—28, 29—30, 30—31, 32—33, 33—34, 35—36 and 36—37, on the other hand, mark the contact between the edge of one screw against the helical surface of the other screw.

As will be seen, the contact line in Fig. 3 forms an uninterrupted line 19 to 38.

For comparison, Fig. 5 illustrates a similar single-thread screw with a line of contact, 39 to 64, as it would be, if also the second screw, not shown in Fig. 5, had been a single-thread screw instead of a double-thread one. On account of the different pitch of a double-thread and a single-thread screw the contact lines have quite different aspects in the two cases. The device as in Fig. 5 would be quite unsatisfactory as the contact line is interrupted between the points 41 and 42, 45 and 46, 49 and 50 and so on. It is necessary to have an uninterrupted contact line as in Fig. 3, in order to attain a fluid-tight closure between the screws.

Fig. 4 illustrates in a sectional view the screw-threads of the screws 2 and 3 in Figs. 1 and 2.

A sectional view illustrating the screw-thread of the single-thread screw according to Fig. 5 and the screwthread of a corresponding single-thread screw is shown in Fig. 6.

Even if the gear-ratio were 1:1 or, in other words, if the number of screw-threads were the same for both screws, the right form of the helical surfaces, necessary for obtaining a fluid-tight closure, could have been obtained. In this case, however, the size of the screws must be different, the outside diameter of the smaller screw being at maximum as great as the inner diameter (or the diameter at the bottom of the threads) of the bigger screw.

Figure 7:
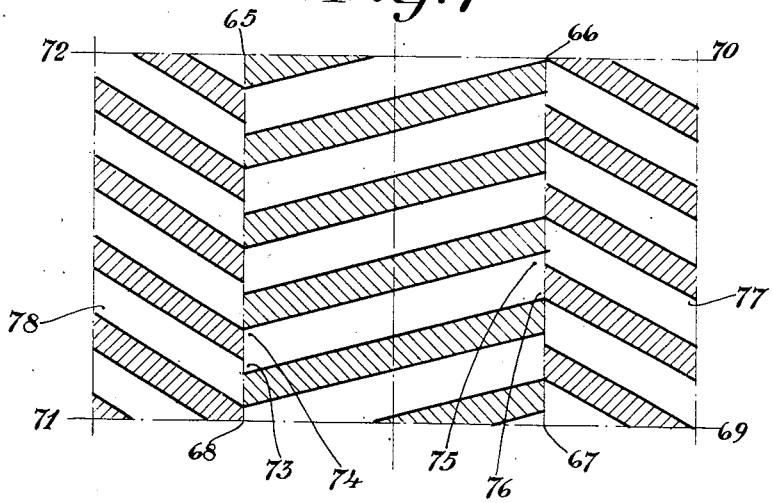
Fig. 7 illustrates diagrammatically the succession of the fluid-tight closures of the screws according to Figs. 1 and 2.

The gear-ratio 1:1 would, however, be unsuitable from another point of view. In order to elucidate said condition a diagrammatic view of the corresponding screw-threads is shown in Fig. 7. This figure shows the arrangement of Fig. 1, the dashed surfaces indicating the threads and the plain surfaces indicating the grooves. The surface 65, 66, 67 and 68 indicates diagrammatically the developed surface of the single-thread screw 3 in Fig. 1, the two surfaces 66, 67, 69 and 70 and 65, 68, 71, 72 indicating the surface of the double-thread screw 2, which is shown divided in two parts, the division line 69—70 being the same as the line 71—72. It will be seen that one groove of the single-thread screw, for example 73—74—75—76 in Fig. 7, corresponds at both ends with two adjacent parts of one groove of the other screw at the points 73 and 75, but is separated from any other groove. In this case, or when the screw 2 is double-threaded, the corresponding parts 75—77 and 73—78 of the communicating grooves form parts of the same screw groove and the two grooves 73—74—75—76 and 75—77—78—73 correspond with each other, but are separated from all other grooves. This condition is necessary for a fluid-tight arrangement, but if both screws were single-threaded or double-threaded a direct communication through the screws would exist. For two co-operating screws it is necessary that the number $(g)$ of screw-threads of one screw and the number $(G)$ of the screw-threads of the second fulfils the condition $$g = G + 1.$$

If more screws of one type ($n$ screws, with $g$ threads per screw) cooperate with one central screw ($G$ threads per screw) this condition would be $$ng = G + n$$

or generally, with $n$ screws of one type and $N$ screws of the other type $$ng = NG + nN$$

It would therefore be possible to use, if $n=1$, $N=1$, or one screw of one type co-operating with one of the other type, either a single-thread screw against a double-thread-screw, or a double-thread screw against a triple-thread screw and so on.

With one screw cooperating with two external screws ($n=2$, $N=1$), the condition would be $2g = G + 2$, or for example $g=2$, $G=2$. In this case all screws would be made with double-threads. Many other more complicated arrangements are possible, but their practical importance is less.

In order to obtain a fluid-tight arrangement, the screws must be made fitting exactly to each other and to the housing. It is advisable to use a slightly different pitch for the two adjacent helical surfaces of each screw. It is of course necessary to use an exactly corresponding pitch on the cooperating screw. As an example, the double-thread screw 2 in Fig. 1 may be made with 2×51=102 mm. pitch on the upper surface of the screw-threads and with 2×50=100 mm. pitch on the lower surface of the same threads. The single-thread screw 3 is then made with 51 mm. pitch on its lower surface and with 50 mm. pitch on its upper surface. The fitting of the screws with proper clearance is made without difficulty only by turning one screw in regard to the other, while simultaneously moving it slightly in the longitudinal direction.

As the width of the groove varies at the points, where the screws are close up to each other, it would seem, as if the volume of fluid enclosed in the grooves between the screws and the housing must vary. This is avoided if, as is the case in the arrangement according to Fig. 1, the dimensions of the screws are the same. In this case the increase of the volume in one screw-thread is exactly compensated through the decrease in the corresponding thread of the other screw. As a general rule, even if more than two screws cooperate, the sum of the average diameters of the screw-threads shall be the same for the one type of screws (left-hand thread) as for the other type (right-hand thread).

Figure 8:
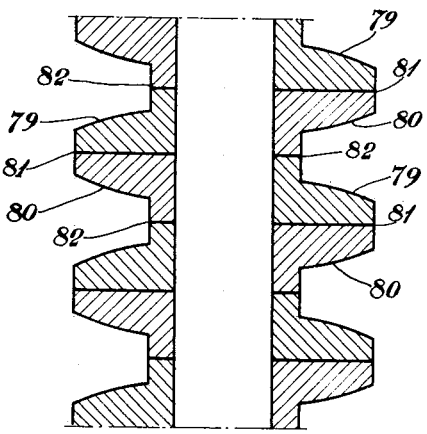
Fig. 8 is a longitudinal section of a screw having a special form fitted for use in a pump or motor according to the invention.

Another suitable construction is illustrated by Fig. 8, showing a section of a screw. This screw is made in two parts, divided along the helical surfaces 81 and 82. The two helical surfaces of the screws, 79 and 80, are made with the same pitch, which is slightly different from the pitch of the surfaces 81 and 82. Through the adjustment of the two parts of the screws the distance between the surfaces 79 and 80 is regulated.

The leakage of fluid through the clearance between the screws and the housing is avoided by placing one or more spiral packings in grooves on the outside of the screws. In Fig. 4 is shown an arrangement with such a packing 83 placed in the middle of the screw-thread of the one screw and with two packings 84 placed in grooves just in the edges of the screw-thread of the other screw, said latter packings fitting not only against the housing but also against the helical surface of the other screw.

Fig. 9 illustrates a symmetrical arrangement having two screws on each shaft, one left-hand and the other right-hand. The shaft 85 being rotated, the gear wheels 86 and 87 give the second shaft 88 an opposite rotation, half as great. The single-thread screws 89 on the shaft 85 cooperate then with the double-thread screws 92 and 93 on the shaft 88. The fluid entering at both ends through the openings 90 into the housing is forced by all the screws into the central chamber between the screws and escapes through the opening 91. The axial pressure is compensated if the screws are fixed upon the shafts. Even in this case a compensating piston for one screw is advisable for facilitating the adjustment. In Fig. 9 the screws 89 and 92 are fixed upon their shafts, the screw 93 on the other hand being movable along the shaft 88 and resting against the piston 94 which fits in a recess in the gear wheel 87. Through a hole 95 in the shaft 88 the pressure of the fluid is brought to the outside of the piston 94, thus compensating the pressure on the screw 93. This device may also be used as a motor or pump.

When the invention is used for a power transmission, both the propelled and the propelling shafts are fitted with similar devices, connected by a pair of fluid conduits. A varying transmission ratio can be obtained by the placing of a number of devices on one or both shafts and by connecting these devices to the circuits in different combinations.

The invention can also be used for regulating the flow of a fluid in a circuit. In this case two or more of the devices described are connected and combined with fluid vents in variable combinations so that parts of the devices are working as a motor, other parts as a pump, the output of the fluid flowing to or from said devices being used to decrease or increase the pressure of the fluid passing through the fluid conduit.

It will be understood that the same inventive principle that I have described can be employed in other devices such as pumps, motors, liquid or gas meters or gas compressors.

What I claim as new and desire to secure by Letters Patent of the United States of America is:—

1. In a power transmission to or from a fluid, the combination of a housing, a number of intermeshing and cooperating revoluble screws in said housing, said screws being of opposite pitch, and the helicoidal surfaces of the thread of the one screw being both substantially concave and those of the thread of the cooperating screw being both substantially convex, so that the screws will fit to each other along an uninterrupted contact line defined by parts of the outside edges of the said helicoidal surfaces and by the lines generating the outside perimeters of the threads and by those generating the inside surfaces of the screw grooves.

2. In a power transmission to or from a fluid, the combination of a housing, a number of intermeshing and cooperating revoluble screws in said housing, said screws being of opposite pitch, and the helicoidal surfaces of the thread of the one screw being both substantially concave and those of the thread of the cooperating screw being both substantially convex, so that the screws will fit to each other along an uninterrupted contact line, defined by parts of the outside edges of the said helicoidal surfaces and by the lines generating the outside perimeters of the threads and by those generating the inside surfaces of the screw grooves, the number of the screw threads of each screw being such that the volumes between the spiral grooves and the housing form a single closure around the cooperating screws, which is separated from adjacent grooves.

3. A power transmission according to claim 1, characterized by the outside diameters of the screws and the inside diameters of the grooves being so dimensioned that the sum of their average is the same in the screws having one kind of pitch as in the screws having the opposite pitch.

4. In a power transmission to or from a fluid, the combination of a housing, a number of intermeshing and cooperating revoluble screws in said housing, said screws being of opposite pitch, and the helicoidal surfaces of the thread of the one screw being both substantially concave and those of the thread of the cooperating screw being both substantially convex, so that the screws will fit to each other along an uninterrupted contact line defined by parts of the outside edges of the said helicoidal surfaces and by the lines generating the outside perimeters of the threads and by those generating the inside surfaces of the screw grooves, at least one of the cooperating screws being divided in two parts, the dividing surface having the form of a helicoidal surface along the threads and the grooves of the screw, the pitch of the dividing surface being different from the pitch of the threads.

5. In a power transmission to or from a fluid, the combination of a housing, a number of intermeshing and cooperating revoluble screws in said housing, said screws being of opposite pitch, and the helicoidal surfaces of the thread of the one screw being both substantially concave and those of the thread of the cooperating screw being both substantially convex, so that the screws will fit to each other along an uninterrupted contact line defined by parts of the outside edges of said helicoidal surfaces and by the lines generating the outside perimeters of the threads and by those generating the inside surfaces of the screw grooves, at least one of said screws being provided with a piston exposed to the fluid pressure and adapted to compensate the axial pressure on said screw.

6. A power transmission according to claim 1, characterized by at least two screws being applied to the same shaft and cooperating with a corresponding number of screws on another shaft.

7. A power transmission according to claim 1, characterized by at least two screws being applied to the same shaft and cooperating with a corresponding number of screws on another shaft, at least one of said screws being displaceably mounted on the corresponding shaft and provided with a piston exposed to the fluid pressure and adapted to compensate the axial pressure on said screw.

In testimony whereof I affix my signature.

CARL OSCAR JOSEF MONTELIUS.